United States Patent

[11] 3,566,031

[72] Inventors John T. Carbone
Englishtown;
Robert C. Morris, Matawan, N.J.; George
Parker, New York, N.Y.
[21] Appl. No. 786,119
[22] Filed Dec. 23, 1968
[45] Patented Feb. 23, 1971
[73] Assignee Bell Telephone Laboratories, Incorporated
Murray Hill, Berkeley Heights, N.J.

[54] DIRECT-CURRENT DATA SET ARRANGED FOR POLAR SIGNALING AND FULL DUPLEX OPERATION
8 Claims, 4 Drawing Figs.

[52] U.S. Cl. .......... 178/59
[51] Int. Cl. .......... H04l 5/14
[50] Field of Search .......... 178/49, 58, 59, 60; 307/237; 328/135; 325/38 (A)

[56] References Cited
UNITED STATES PATENTS

| | | | |
|---|---|---|---|
| 3,076,144 | 1/1963 | Blasbalg | 328/135 |
| 3,130,371 | 4/1964 | Copeland | 328/135 |
| 3,267,459 | 8/1966 | Chomicki et al. | 325/38(A) |
| 3,427,475 | 2/1969 | Wilkinson et al. | 179/25(LL) |
| 3,433,159 | 5/1969 | Altfather | 325/30 |

*Primary Examiner*—Kathleen H. Claffy
*Assistant Examiner*—David L. Stewart
*Attorney*—R. J. Guenther and Kenneth B. Hamlin

ABSTRACT: A data set receiver detects the direction and magnitude of the cumulative polar loop current on a full duplex two-wire line. The detected signals are applied to a signal slicer which is biased to discriminate between incoming and outgoing signals. The bias is modified to change the slicing level to compensate for the outgoing signal currents. Changes in the output of the slicer are momentarily precluded after transitions of the outgoing signals to filter out line transients. An alarm circuit for line signal failure is also included in the set.

INVENTORS
J. T. CARBONE
R. C. MORRIS
G. PARKER
BY R. C. Lipton
ATTORNEY

DIRECT-CURRENT DATA SET ARRANGED FOR POLAR SIGNALING AND FULL DUPLEX OPERATION

FIELD OF THE INVENTION

This invention relates to full duplex polar loop signaling over two-wire lines and, more particularly, to data sets arranged for direct-current polar signaling and full duplex operation.

DESCRIPTION OF THE PRIOR ART

Low-speed data sets communicating over short and medium haul telephone lines may employ voice frequency or direct-current signaling techniques. The direct-current signaling can involve alternate current-no current signals or polar current signals, the latter technique being produced through battery reversal wherein current circulates in one direction, such as clockwise, around the two-wire loop of the telephone line when marking current is being transmitted and circulates in the other direction when spacing current is being transmitted. This type of signaling is attractive for medium haul loops since the data sets do not require expensive reactive components necessary for voice transmission or do not require the high current signals, which develop crosstalk, necessary for on-off type signaling.

To recover the polar current signals on the two-wire loop, each data set may utilize a monitor which detects the magnitude and direction of the current on each wire. The current flow on each leg is compared to obtain the direction of the circulating current in the loop and, to thus determine the signal applied thereto. In addition, the magnitude of the circulating current may be monitored to detect whether the signal level falls below a permissible threshold. One arrangement for recovering signals in this manner is disclosed in the copending application of J. T. Carbone, O. F. Gerkensmeier and G. Parker, Ser. No. 566,564, now U.S. Pat. No. 3,505,475, which was filed on Jul. 20, 1966.

If full duplex signaling is provided on the line, in accordance with one form of the practice, the magnitude for the battery supply providing spacing current exceeds the magnitude for the battery supply providing marking current. Thus, when one set is sending spacing and the other is sending marking, the spacing current overcomes the opposing marking current and the direction of the circulating current indicates that a spacing signal is being applied to the line. When both sets are sending spacing, the two currents are aiding and the magnitude of the spacing current is over twice the magnitude of the current which circulates when only one set sends spacing. It is obvious that the determination of the direction and magnitude of the circulating current is inadequate for recovering polar signals where full duplex signaling is provided.

It is also well known to utilize differential relay circuit arrangements to recover incoming signals on full duplex lines. These arrangements, however, are limited to very low-speed signaling and are relatively expensive and unreliable. It is, therefore, desirable to use electronic circuits and more specifically, to use solid state circuitry for monitoring and detecting the incoming polar signals.

Another problem in full duplex signaling arises when the data set goes from one signaling condition, such as sending marking, to the other signaling condition, such as spacing. In this event, the battery reversal may produce a transient on the line which may be interpreted as a signal change from the remote set. For example, if both sets are sending marking, the transient on the line when the local set changes to spacing might momentarily produce a magnitude of spacing current which equals the magnitude developed when both sets are sending spacing. If both sets are sending spacing, the transient produced when the set switches to marking might momentarily reverse the circulating current.

SUMMARY OF THE INVENTION

It is therefore an object of this invention to recover incoming polar current signals on a full duplex line.

It is another object of this invention to discriminate between incoming and outgoing polar current signals.

It is a further object of this invention to filter out line transients caused by transitions of the outgoing signals.

In accordance with an illustrative embodiment of this invention, a signal slicer (which may take the form of a difference amplifier) is utilized to examine the direction and magnitude of the loop current. Advantageously, a bias signal is applied to the slicer, the magnitude of the bias being intermediate the signal levels developed by the incoming marking current and spacing current on the line.

It is a feature of this invention that the level of the bias signal is modified in accordance with the outgoing signals. Specifically, when the local set is sending marking, the level of the bias signal is arranged to be intermediate the signal level developed, by the monitor, when both sets are sending marking and the signal level developed when one set is sending spacing and the other sending marking. Alternatively, when the local set is sending spacing, the level of the bias signal is arranged to be intermediate the signal level developed when both sets are sending spacing and the signal level developed when one set is sending spacing and the other set is sending marking. The signal slicer is thus able to discriminate between incoming and outgoing signals.

It is another feature of this invention to filter out line transients, when there is a transition of the outgoing signal, by precluding any change or transition of the incoming signal recovered from the line current. The filter comprises a timer operated when there is a transition of the outgoing signal and a logic circuit, connected to the output of the signal slicer, for maintaining the prior condition of the output signal of the slicer for the operating period of the timer.

BRIEF DESCRIPTION OF THE DRAWING

The foregoing and other objects and features of this invention will be fully understood from the following description of an illustrative embodiment taken in conjunction with the accompanying drawing wherein FIGS. 1 through 3, when arranged as shown in FIG. 4, disclose the details of circuits and equipment which cooperate to form a full duplex polar signaling system in accordance with this invention.

GENERAL DESCRIPTION

Figure 1:
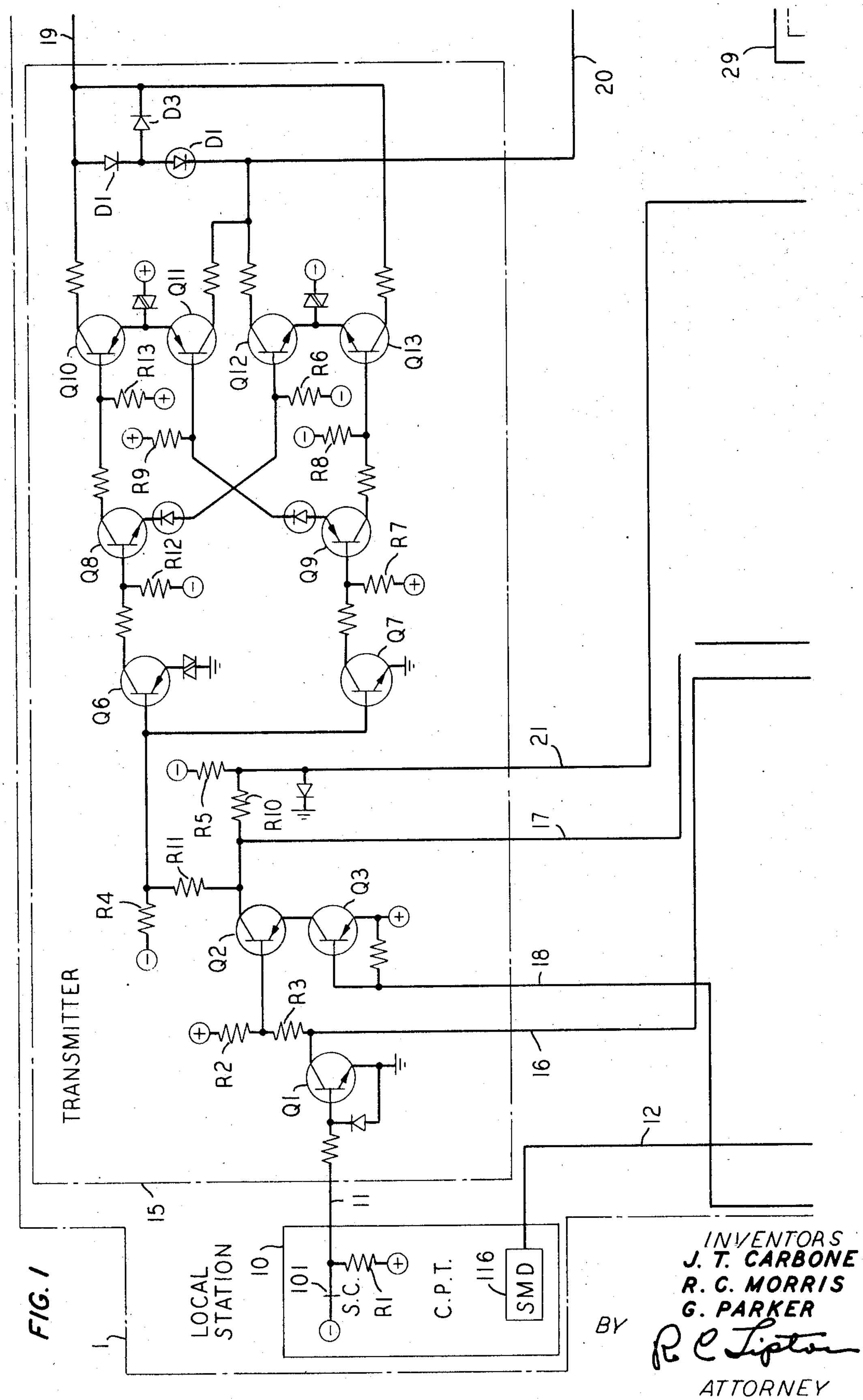
Figure 2:
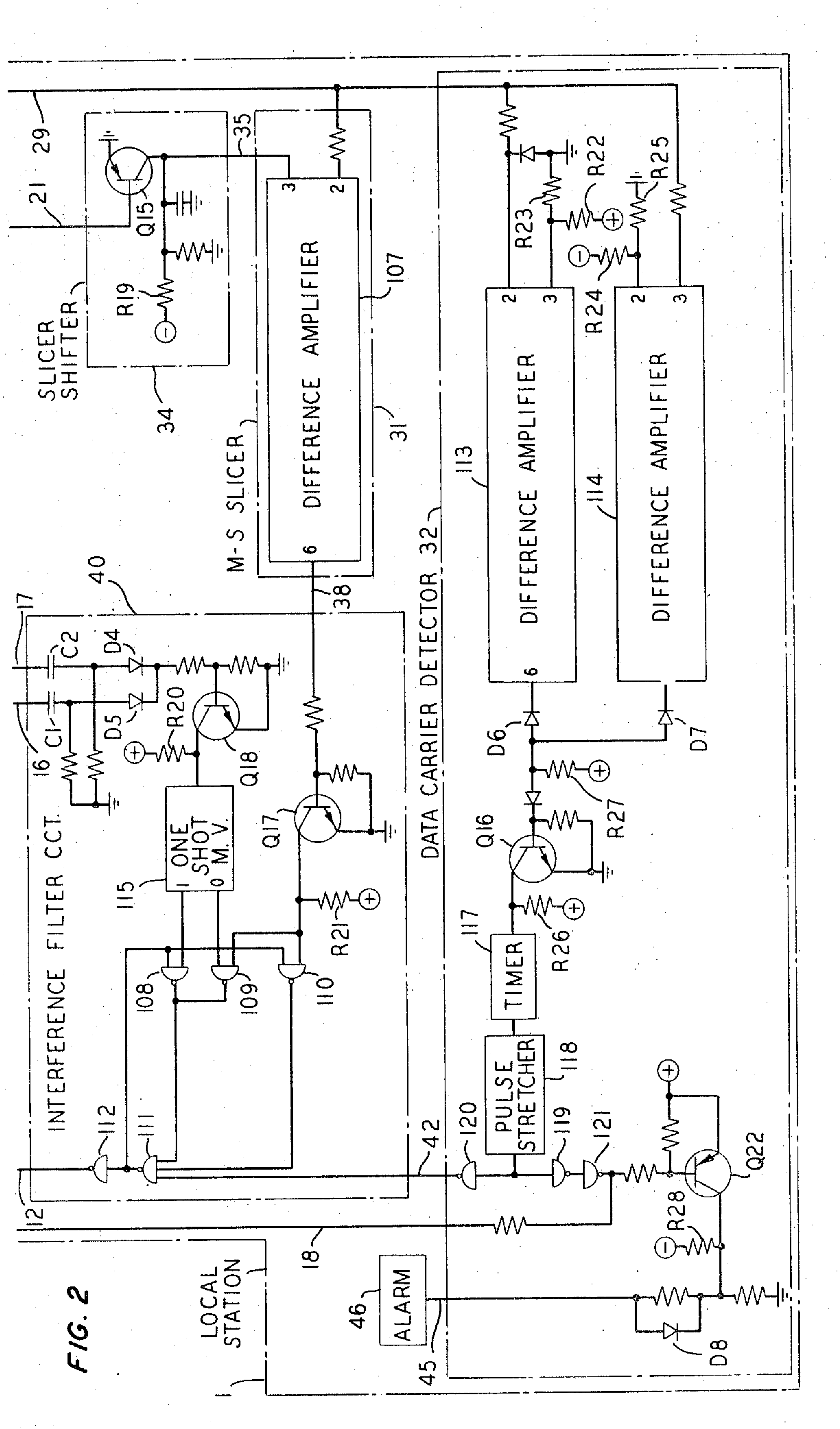
Figures 3, 4:
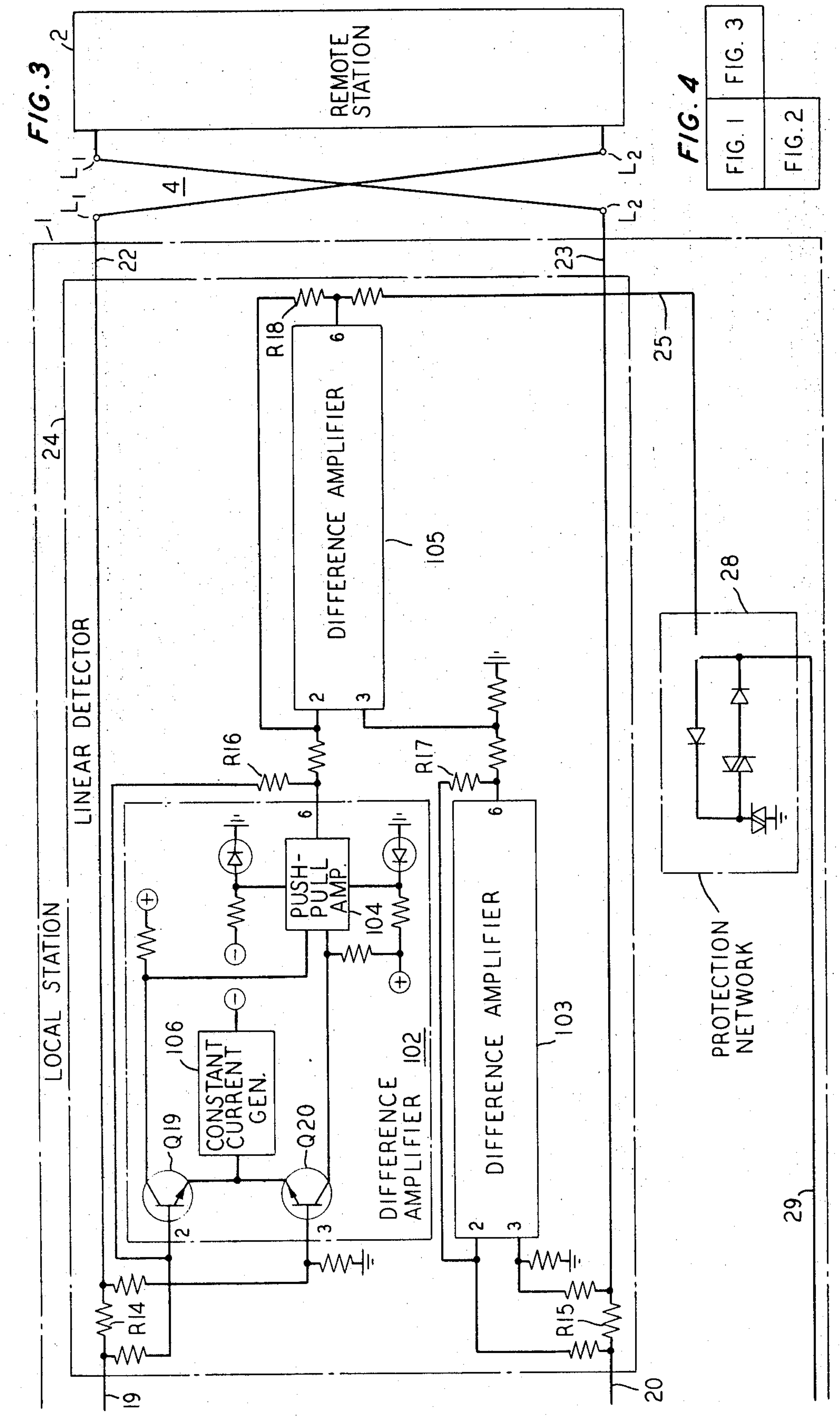

A specific arrangement for employing the present invention may comprise two stations, such as local station 1, shown in FIGS. 1 through 3, and an identical remote station, generally indicated by block 2 in FIG. 3. The stations communicate with polar DC current by way of communication line 4, FIG. 3. It is noted that, as shown in the drawing, communication line 4 comprises two metallic leads. Other communication media, of course, may be used that can accommodate polar signaling.

With respect to the arrangement shown in the drawing, each station sends a marking signal by applying current to line 4 by way of its corresponding terminal L1, which current returns via the remote station and line 4 to terminal L2. Each station sends a spacing signal by applying current to line 4 via its corresponding terminal L2, with the return current from the remote station being applied to terminal L1.

Assume that both stations are sending marking signals. As described hereinafter, a voltage source at each station develops current which is passed from terminal L1 of each station to terminal L2 of the remote station and then, by way of terminal L1 of the remote station, back to terminal L2 of the local station. The voltages are poled in the same direction and the currents thus aiding.

Assume now that the local station is sending a space signal while the remote station is transmitting a mark signal. In this event the local station applies current to terminal L2. As disclosed in detail hereinafter, this is affected by a voltage reversal in the local station, which voltage is preferably 3 times the magnitude of the marking voltage. The net result is a reversal of current whereby current flows from terminal L2 of the station sending the spacing signal to terminal L1 of the remote station and then by way of terminal L2 of the remote station back to terminal L1 of the local station. Similarly, when the remote station is sending spacing signals and the local station is marking, there is a reversal of current from the condition where both stations are sending marking signals and current flows from terminal L2 of the remote station to terminal L1 of the local station and then back to the remote station by way of terminal L2 of the local station to terminal L1 of the remote station.

In the event that both stations are sending space signals, both stations have reversed the signal voltage developed therein, whereby aiding spacing current flows from the L2 terminal of each station to the L1 terminal of the remote station. This aiding current is 3 times the magnitude of the spacing current developed when only one station is sending a signal.

Considering now local station 1, the station generally includes a customer provided terminal or teletypewriter with appropriate interface circuitry, generally indicated by block 10 in FIG. 1, a transmitter 15, a linear detector 24 shown in FIG. 3, a protection network 28, a slicer shifter 34 shown in FIG. 2, a mark-space slicer 31, a data carrier detector 32, an interference filter circuit 40, and an alarm device generally indicated by block 46.

Outgoing signals are generated by terminal 10 and applied by way of lead 11 to transmitter 15. The incoming signals received by local station 1 are detected and applied to lead 12 to be recorded by terminal 10.

Assume first that both the local station 1 and remote station 2 are sending marking signals. Considering the local station 1, with terminal 10 generating a mark signal, lead 11 has applied thereto a voltage negative with respect to ground. This negative potential is passed to transmitter 15. Transmitter 15 in response to the negative marking signal renders the potential on output lead 19 positive with respect to output lead 20. As described in detail hereinafter, this provides a current flow from transmitter 15 to linear detector 24 by way of lead 20 under the assumed conditions that both stations are transmitting marking signals. With a negative marking potential being applied to transmitter 15 by terminal 10, transmitter 15 also renders output lead 16 positive and renders output leads 17 and 21 negative with respect to ground.

It is noted that leads 16 and 17 extend to interference filter circuit 40 and lead 21 extends to slicer shifter 34. The functions of these circuits and the effects of the potentials on leads 16, 17 and 21 are described hereinafter.

Return now to linear detector 24. The marking current applied thereto by transmitter 15 through lead 19 is passed through to lead 22 and then to output terminal L1 of local station 1. The returning current being received on terminal L2 is passed by way of lead 23, linear detector 24 and lead 20 back to transmitter 15. A function of linear detector 24 is to sense the direction and the magnitude of the current and in response to this marking current passing therethrough, linear detector 24 develops a positive potential on lead 25. This positive signal is then passed through protection network 28 to lead 29, protective network 28 providing a limiting function to eliminate excessive voltages to provide protection for subsequent circuits. The positive potential on lead 29 is passed to mark-space slicer 31 and data carrier detector 32, whose functions will be described hereinafter. Another function of linear detector 24 is to compensate or balance out ground currents developed by differences of ground potential between the two stations. The manner in which detector 24 provides ground compensation is described in detail hereinafter.

Assume now that the remote station is still sending a marking signal and the local station sends a spacing signal. In this event, terminal 10 removes the negative potential applied to lead 11 and substitutes therefor a positive potential. Transmitter 15, in response to the application of the positive potential, renders output lead 20 positive with respect to output lead 19. As described in detail hereinafter, the magnitude of this spacing potential is 3 times the magnitude of the marking potential previously described. Accordingly, the marking current developed by the remote station 2 will be overcome and spacing current will flow from transmitter 15 through lead 20, linear detector 24 and lead 23 to output terminal L2. The returning spacing current will pass through terminal L1, lead 22, linear detector 24 and lead 19 to transmitter 15. In addition, a positive spacing signal being applied to transmitter 15 by terminal 10, output lead 16 moves to ground, and output leads 17 and 21 are driven positive with respect to ground for purposes described hereinafter.

Linear detector 24 now senses the spacing current flowing from transmitter 15 by way of lead 20 to lead 23 and the incoming spacing current flowing from lead 22 therethrough to lead 19. In response thereto, linear detector 24 applies a negative signal to output lead 25 and this negative signal is passed through protection network 28 and lead 29 to mark-space slicer 31 and data carrier detector 32.

Assume now that the local station 1 is sending a marking signal and the remote station 2 is sending a space signal. In this event, terminal 10 applies a negative mark signal to transmitter 15 by way of lead 11, as previously described. Transmitter 15 applies a positive potential to lead 16 and negative potentials to leads 17 and 21 at the same time transmitter 15 attempts to apply marking current to linear detector 24 by way of lead 19. With remote station 2 sending a space signal, however, the incoming spacing current to terminal L1 of local station 1 (which current passes from lead 22 through linear detector 24 to lead 19 and then back through lead 20, linear detector 24 and lead 23 to terminal L2) overcomes the marking current, as previously described. Thus, linear detector 24 senses spacing current passing therethrough and applies a negative potential to output lead 25, which potential is passed through protection network 28 and lead 29 to mark-space slicer 31 and data carrier detector 32.

In the event that both stations are sending space signals, terminal 10 of local station 1 passes a positive potential to transmitter 15 via lead 11. Lead 16 now goes to ground and leads 17 and 21 have positive potentials applied thereto. Transmitter 15 now applies spacing current to lead 20, which current passes through linear detector 24 and lead 23 to output terminal L2. The current is returned to terminal L1 and passed by way of lead 22, linear detector 24 and lead 19 to transmitter 15. At this time, however, remote station 2 is also passing spacing current in the same direction. The net effect of two spacing currents provides a magnitude more than twice as great as the effect provided by a spacing signal from only one station. The negative voltage developed by linear detector 24 on lead 25 is, therefore, more than twice the negative voltage developed when only one station is sending a spacing signal. This negative voltage is similarly passed through protection network 28 and lead 29 to mark-space slicer 31 and data carrier detector 32.

As previously described, lead 29 extends to mark-space slicer 31. Another input to mark-space slicer 31 is applied by lead 35 from slicer shifter 34. The input of slicer shifter 34, in turn, is received over lead 21. As previously described, lead 21 is negative with respect to ground when the local station is sending a mark signal and is positive with respect to ground when local station 1 is sending a spacing signal. Slicer shifter 34, in response to the negative signal, passes a potential substantially at ground to mark-space slicer 31 by way of lead 35. Conversely, when transmitter 15 applies a positive potential to slicer shifter 34 by way of lead 21, slicer shifter 34 applies a negative potential to mark-space slicer 31 via lead 35. The magnitude of the negative potential on lead 35 is arranged to be intermediate to the negative potential applied to lead 29 by linear detector 24 when one station is sending a space and the negative potential on lead 29 when both stations are sending space signals.

Mark-space slicer 31 functions to compare the line signal current condition on line 4 with the signaling condition generated by transmitter 15 at the local station. In other words, mark-space slicer 31 compares the potential of the signal developed on lead 35 with the signal potential developed on lead 29. Assume now that both the local and remote stations are sending mark signals. In this event, lead 29 and lead 35 are both in their relatively positive condition, i.e., lead 29 is positive and lead 35 is substantially at ground. Mark-space slicer 31 thereupon applies a negative potential to output lead 38 to indicate that a marking signal is being received from remote station 2.

In the event that local station 1 is sending a space signal and remote station 2 is sending a mark signal, the potential on lead 35 goes negative as does the potential on lead 29. In this event the magnitude of the negative potential on lead 35 exceeds the magnitude of the negative potential on lead 29. With the potential on lead 29 more positive than the potential on lead 35, mark-space slicer 31, in response thereto, applies a negative potential to lead 38 to indicate that remote station 2 is sending a mark signal.

Assume now that the local station is sending a mark signal and the remote station is sending a space signal. In this event lead 29 is negative with respect to ground and lead 35 is substantially at ground. The potential on lead 35 goes positive with respect to the potential on lead 29. Mark-space slicer 31 now provides a positive potential to output lead 38. This indicates that the remote station is sending a space signal.

Assume now that both stations are sending space signals. In this event, a negative potential is applied to lead 35 by slicer shifter 34 and a negative potential is also applied to lead 29. The magnitude of the negative potential on lead 29 exceeds the magnitude of the potential on lead 35, however, as previously described, with both stations sending space signals. Accordingly, lead 35 is positive with respect to lead 29 and mark-space slicer 31 accordingly applies a positive potential to output lead 38. This indicates that remote station 2 is sending a space signal.

Lead 38 extends to interference filter circuit 40. The function of interference filter circuit 40 is to pass the signal on lead 38 to terminal 10 by way of lead 12 and, in addition thereto, to momentarily preclude any change on lead 12, when a signal reversal occurs on output lead 11 of terminal 10. This protects against false transitions on lead 38 resulting from line current surges due to any capacitance of transmission line 4. The current surges override the incoming current signals from remote station 2 whenever the potential on lead 11 is reversed by terminal 10, thereby setting up a line current transient. In accordance therewith, when the signal on lead 11 goes from marking to spacing the potential on lead 17 goes positive and this positive going transition is applied to interference filter circuit 40 which, as described in detail hereinafter, momentarily maintains the signal condition on lead 12 even though a reversal of potential may occur on lead 38. After this predetermined momentary interval, however, interference filter circuit 40 permits lead 12 to again follow the potential on lead 38. If terminal 10 switches from a spacing signal to a marking signal, lead 16 goes positive and this positive transition is passed to interference circuit 40, which provides the same momentary delay described with respect to the mark to space transition. Accordingly, the signal on lead 12 is momentarily maintained when the transmitted signal switches regardless of any change of potential on input lead 38.

The signal potentials on lead 12 indicate the incoming signaling from the remote station, as previously described. Specifically, lead 12 goes negative when remote station 2 is sending a mark signal and goes positive when remote station 2 is sending a space signal. These signals are then passed to terminal 10, which records the data transmitted by the remote station.

Data carrier detector 32 functions to detect loss of signaling current on transmission line 4. Specifically, data carrier detector 32 follows the potentials on lead 29 and detects when these potentials fall below a predetermined threshold. In the event this signal remains below the predetermined threshold for a predetermined interval of time, data carrier detector 32 removes the positive potential normally applied to lead 45 and applies a negative potential thereto, which potential is passed to alarm device 46. Alarm device 46 may comprise any conventional visual or audible alarm and is energized upon the application of the negative potential thereto.

Data carrier detector 32, upon the loss of line signal current, also passes a potential substantially at ground to interference filter circuit 40 by way of lead 42. As described hereinafter, this has the effect of clamping the signal output lead 12 of interference filter circuit 40 in the marking state. Accordingly, a mark-hold condition is set up and passed terminal 10. Finally, the detection of the alarm condition by data carrier detector 32 results in the application of a positive potential to output lead 18. The positive potential on lead 18 is passed to transmitter 15 and forces transmitter 15 to apply marking current to output leads 19 and 20.

The restoration of the signal line current on transmission line 4 is detected by data carrier detector 32. If this restoration persists for a predetermined minimum of time, to preclude response to any line "hits" or noise, data carrier detector 32 restores the positive potential to lead 45, thus deenergizing alarm 46. In addition, data carrier detector 32 restores the normal ground potential to lead 18 and restores the normal positive potential to lead 42. Accordingly, the normal condition of the station is restored.

DETAILED DESCRIPTION

Refer again to terminal 10. During the interval when the marking signal is transmitted, negative battery is applied to lead 11, as previously described. As seen in terminal 10, this negative battery is passed by way of send contacts 101. Conversely, when a spacing signal is transmitted, send contacts 101 open, whereby positive battery is applied by way of resistor R1 to lead 11. These signals are then passed to the base of transistor Q1 in transmitter 15.

Assume now that a space-to-mark transition occurs. The potential on lead 11 goes from positive to negative. This potential is applied to the base of transistor Q1 in transmitter 15 and the transistor thereupon turns OFF. The potential at the collector of transistor Q1 thereupon rises from ground due to positive battery applied by way of resistors R2 and R3. Accordingly, a positive potential is passed to the base of transistor Q2 and a positive going transition is applied from the collector of transistor Q1 to capacitor C1 in interference filter circuit 40 by way of lead 16.

Refer now to transistor Q2. It is seen that the emitter is connected to the collector of transistor Q3. Transistor Q3 is normally turned ON due to the application of ground to its base by way of lead 18, which ground potential is derived from data carrier detector 32, as described hereinafter. Transistor Q3 thereby passes a positive potential by way of its emitter-to-collector path to the emitter of transistor Q2. Since, during the marking signal a positive potential is applied to the base of transistor Q2, this transistor is turned OFF. With transistor Q2 turned OFF, a negative potential is passed by way of resistor R4 to the base of transistor Q6 and to the base of transistor Q7. In addition, with transistor Q2 turned OFF, a negative potential is passed by way of resistor R5 to lead 21 and then to slicer shifter 34 for purposes described hereinafter.

Return now to transistors Q6 and Q7. The application of negative potential to the bases turns transistor Q6 ON and turns transistor Q7 OFF. With transistor Q6 ON, ground is passed by way of its emitter-to-collector path and then to the base of transistor Q8. This turns transistor Q8 ON since its emitter is connected to negative battery by way of resistor R6, in parallel with the base of the emitter path of transistor Q12. With transistor Q8 turned ON, its collector potential drops, thereby applying negative potential to the base of transistor Q10 with respect to its emitter and transistor Q10, in turn, turns ON. In addition with transistor Q8 turned ON, its emitter potential rises. This rising potential is passed to the base of transistor Q12 and the latter transistor also turns ON.

It is recalled that negative potential is also applied to the base of transistor Q7, turning the transistor OFF. This removes ground from the collector of transistor Q7, driving the base of transistor Q9 positive by way of resistor R7. Transistor Q9 thereupon turns OFF, opening the emitter-to-collector ground path. The potential on its collector thus drops, permitting negative battery to be applied to the base of transistor Q13 by way of resistor R8. Transistor Q13, therefore, turns OFF. In addition, the potential at the emitter of transistor Q9 rises due to the application of a positive potential by way of resistor R9. This rising potential is passed to the base of transistor Q11, turning it OFF. Accordingly, when terminal 10 is sending a marking signal transistors Q10 and Q12 are turned ON and transistors Q11 and Q13 are turned OFF. This passes marking current through output leads 19 and 20, as described hereinafter.

Assume now that terminal 10 initiated the transmission of a space signal. Send contacts 101 thereupon open and positive battery is passed by way of resistor R1 to lead 11. This positive potential is applied to the base of transistor Q1, turning it ON. The collector potential drops to ground, lowering the potential at the junction of resistor R2 and resistor R3. The lowered potential forward biases the base-to-emitter junction of transistor Q2 and, since transistor Q3 is turned ON, as previously described, transistor Q2 in turn, begins to conduct, raising the potential on the collector. This positive transition on the collector is passed by way of lead 17 to capacitor C2 in interference filter circuit 40. In addition, the positive potential is applied through resistor R10 to slicer shifter 34 by way of lead 21.

Return now to transistor Q2. The rising collector potential is passed by way of resistor R11 to the bases of transistors Q6 and Q7. Transistor Q6, therefore, turns OFF and transistor Q7 turns ON. With transistor Q6 turned OFF, a negative potential is passed by way of resistor R12 to the base of transistor Q8. This turns transistor Q8 OFF, permitting a positive potential to be applied to the base of transistor Q10 by way of resistor R13, turning OFF, in turn, transistor Q10. With transistor Q8 turned OFF, in turn, transistor Q10. With transistor Q8 turned OFF, a negative potential is passed by way of resistor R6 to the base of transistor Q12, turning this latter transistor OFF.

Recalling now that during a spacing signal transistor Q7 is turned ON, ground is thus applied from its collector to the base of transistor Q9. Transistor Q9 thereupon turns ON, raising its collector potential. This increased collector potential is passed to the base of transistor Q13, turning it ON. In addition, the potential on the emitter of transistor Q9 drops and this lowered potential is passed to the base of transistor Q11 to turn this latter transistor ON. Thus, when transmitter 15 is sending spacing current to the line, as described hereinafter, transistors Q11 and Q13 are turned on and transistors Q10 and Q12 are turned OFF.

When transmitter 15 is sending a marking signal transistor Q10 and Q12 are turned ON. Current is, therefore, passed from positive battery through the emitter-to-collector path of transistor Q10 to output lead 19.

The marking current flows to the remote station and returns on line 20 and through the collector-to-emitter path on transistor Q12 to negative battery. The collector current of transistor Q10 is also passed through diode D1, breakdown diode D2 and the collector-to-emitter pate of transistor Q12 to negative battery. It is noted that diode D1 preferably provides a predetermined voltage drop, such as 4 volts, for example. Diode D1, therefore, may represent a plurality of diodes in series to obtain the desired voltage drop. It is thus seen that the voltage drop across leads 19 and 20 constitutes the drop across diodes D1 and D2, which drop is approximately 4 volts during the transmission of a marking signal.

In the event that the remote station is sending a space signal and the local station is sending a mark signal, the incoming space current on lead 19 overcomes the outgoing mark current provided by transmitter 15. It will be shown that this spacing current is provided by a source of potential at the remote station which is the reverse of the marking signal potential and approximately 3 times the magnitude. Accordingly, the resulting flow of current through leads 19 and 20 is reversed due to the incoming space signal and this incoming space current on lead 19 passes through diode D1 and diode D2 and returns over lead 20.

If transmitter 15 is sending a space signal transistor Q10 and Q12 are each OFF and transistors Q11 and Q13 are ON. Current is thus passed from positive battery through the emitter-to-collector path of transistor Q11 to output lead 20. The returning spacing current on lead 19 then passes through the collector-to-emitter path of transistor Q12 to negative battery. The collector current of transistor Q11 also passes by way of breakdown diode D2 and diode D3 through the collector-to-emitter path of transistor Q13. It is noted that breakdown diode D2 is preferably arranged to break down at approximately 12 volts. Accordingly, the voltage potential across leads 19 and 20 is reversed with respect to the mark signal and, in addition, the magnitude of the potential is approximately 12 volts.

If, while the local station is sending a space signal, the remote station is sending a mark signal, the direction of the incoming mark current opposes the locally generated spacing current. The voltage source generating the spacing current is, however, more than twice the potential of the marking voltage source. The resultant current on line 4 is therefore spacing current provided to terminal L2 from lead 20 of the local station and returned to terminal L1. The magnitude of this spacing current comprises the magnitude of the spacing current from the local station reduced by the magnitude of the marking current from the remote station. Therefore, this signaling condition on line 4 is substantially identical to the condition where the local station is sending a mark signal and the remote station is sending a space signal.

If both stations are concurrently sending space signals the two spacing currents are in aiding relationship and the resultant space current on line 4 has a magnitude of twice the space current supplied by one station. Compared with the situation where one station is sending a mark signal which opposes the space signal of the other station, it can be seen that the magnitude of the spacing current where two stations are sending space is greater than twice the magnitude of the spacing current developed where one station sends spacing current and the other station sends opposing marking current.

As previously described, the currents on leads 19 and 20 are passed to output leads 22 and 23, respectively, by way of linear detector 24. Specifically, lead 19 is connected to lead 22 by way of resistor R14 and lead 20 is connected to lead 23 by way of resistor R15. Linear detector 24 functions to detect the amount and direction of current on the loop by sensing the magnitude and direction of the voltage drops across resistors R14 and R15.

As seen in the drawing, one terminal of resistor R14 is connected to input terminal 2 of a high gain difference amplifier, generally indicated by block 102, with the other terminal of resistor R14 connected to input terminal 3 of difference amplifier 102. It is noted that output terminal 6 of difference amplifier 102 is connected to input terminal 2 by way of a negative feedback resistor R16. This results in the difference amplifier operating in its linear region.

Consider now the details of difference amplifier 102. Input terminal 3 is connected to the base of transistor Q20. The emitters of transistors Q19 and Q20 are connected together and to negative supply through a constant current generator, generally indicated by block 106. Accordingly, the transistors are arranged as a differential pair and the collectors of each are then applied to a push-pull amplifier, generally indicated by block 104. The output of push-pull amplifier 104 then extends to output terminal 6 of difference amplifier 102. Output terminal 6 follows the relative difference in potential between input terminal 3 and input terminal 2. Specifically, the voltage on output terminal 6 is positive when the voltage on input terminal 3 exceeds the voltage on input terminal 2 and rises in magnitude as the difference in potential between the two increases. Conversely, the potential on output terminal 6 is negative when the potential on input terminal 2 exceeds the potential on input terminal 3 and increases in magnitude with the difference between these input potentials.

Assume now that marking current passes through resistor R14. In this event the potential on input terminal 2 is more positive than the potential on input terminal 3. Accordingly, output terminal 6 of amplifier 102 is rendered negative. If it be assumed that one station is sending a space signal and the other is sending a mark signal, the space current through resistor R14 renders the potential on input terminal 3 positive with respect to the potential on input terminal 2. Output terminal 6 of amplifier 102 is thus rendered positive. When both stations are sending space signals, input terminal 3 is again positive with respect to input terminal 2, but in this event the difference in potential is more than twice the magnitude of the difference in potential developed when only one station is sending a space signal. Accordingly, the positive output potential on output terminal 6 has a correspondingly greater magnitude.

The potential developed across resistor R15 is sensed by high gain difference amplifier 103 which also is maintained in its linear region by negative feedback resistor R17. When mark current passes through resistor R15 input terminal 3 is rendered positive with respect to input terminal 2, whereby output terminal 6 develops a positive potential thereon. Conversely, spacing current through resistor R15 develops a negative output signal on output terminal 6. The negative output signal is more than twice the magnitude, of course, when both stations are sending a space signal as opposed to the case where one station is sending a space and the other is sending a mark signal.

Output terminal 6 of amplifier 102 extends to input terminal 2 of high gain difference amplifier 105. Input terminal 3 of high gain difference amplifier 105 is connected to output terminal 6 of amplifier 103. It is noted that amplifier 105 also includes a negative feedback resistor R18 to maintain the amplifier in its linear region.

Recalling now that a marking signal renders the output of amplifier 102 negative and the output of amplifier 103 positive, it is seen that input terminal 3 of amplifier 105 is rendered positive with respect to input terminal 2. Accordingly, output terminal 6 of amplifier 105 moves positive and this positive signal is passed to output lead 25. If one of the stations is sending a space signal, a positive potential is applied to input terminal 2 of amplifier 105 and a negative potential is passed to terminal 3. Accordingly, a negative potential is developed on terminal 6 of amplifier 105 and this negative signal is passed to output lead 25. Finally, if both stations are sending a space signal, input terminal 2 is also rendered positive with respect to input terminal 3 of amplifier 105. However, in this event the magnitude of the difference in potential between the two input terminals is over 2 times greater than when one station is sending a space signal and the other station is sending a mark. Accordingly, the negative signal on output terminal 6 of amplifier 105 is over twice as great in magnitude and this signal is also passed through output lead 25.

It is a feature of linear detector 24 that longitudinal ground currents caused by the difference in potential between the grounds of the two stations are canceled out. These currents always pass through resistors R14 and R15 in the same direction, i.e., either outwardly to the line or inwardly from the line. Assume first that incoming ground currents are present. Accordingly, the potential on terminal 3 of amplifier 102 will be increased with respect to input terminal 2. This has the effect of raising the potential in a positive direction on output terminal 6. At the same time the ground current through resistor R15 increases the potential on input terminal 3 of amplifier 103 with respect to input terminal 2. Accordingly, the output potential of amplifier 103 is raised in a positive direction. With the outputs of both amplifiers 102 and 103 raised in a positive direction and then passed on to input terminals 2 and 3 of amplifier 105, the potential difference therebetween is thus maintained constant whereby amplifier 105 sees only the loop current. Conversely, outgoing currents through resistors R14 and R15 render input terminals 2 of amplifiers 102 and 103 more positive, thus rendering output terminal 6 of each amplifier more negative. Accordingly, each input of amplifier 105 is more negative, maintaining the potential difference between the two constant, thus canceling out the effect of any outgoing longitudinal currents.

Output lead 25 is connected to protection network 28. Protection network 28 functions to eliminate current surges and, specifically, includes two parallel diode networks, one network arranged to eliminate positive voltage surges above a predetermined threshold and the other diode network being arranged to eliminate negative surges above a predetermined threshold. This threshold is sufficiently high to permit the passage of normal signals. The signals are then applied to lead 29 and then to mark-space slicer 31 and data carrier detector 32.

Considering first mark-space slicer 31, it is seen that it generally includes a high gain difference amplifier, generally indicated by block 107. The amplifier is arranged substantially the same as amplifier 102 with the exception that amplifier 107 does not include a negative feedback resistor. Lead 29 extends to input terminal 2 of amplifier 107. Input terminal 3 of amplifier 107 is connected to the output of slicer shifter 34 by way of lead 35.

Considering now slicer shifter 34, it is recalled that the input is provided by lead 21 from transmitter 15. Lead 21, it is recalled, is negative when a marking signal is being transmitted by the local station and rises above ground when a spacing signal is being transmitted. Lead 21 is connected to the base of transistor Q15 in slicer shifter 34. Therefore, when a mark signal is being transmitted, a negative potential is passed to transistor Q15 which thereupon turns ON. Ground is, therefore, applied to output lead 35 of slicer shifter 34 when a mark signal is being transmitted. Conversely, when a space signal is being transmitted, the potential on lead 21 rises above ground, turning OFF transistor Q15. Negative potential is, therefore, applied by way of resistor R19 to output lead 35.

Returning now to mark-space slicer 31, if a mark signal is being transmitted by the local station, ground is applied by way of lead 35 to input terminal 3 of amplifier 107. If both stations are sending mark, then lead 29 has a positive potential applied thereto. Terminal 2 of difference amplifier 107 is thus positive in potential with respect to terminal 3, whereby output terminal 6 of amplifier 107 is rendered negative. This negative signal is then applied to output lead 38 and indicates that a mark signal is being received from the remote station.

If the local station is sending a mark and a space is being received from the remote station, ground is applied by way of lead 35 to input terminal 3 of difference amplifier 107 and a negative potential is applied to input terminal 2 by lead 29. Input terminal 3 is thus positive with respect to input terminal 2, thereby rendering output terminal 6 positive. The positive potential applied to output lead 38 indicates that a spacing signal is being received.

Assume now that the local station is sending a spacing signal. Lead 35 now applies a negative potential to input terminal 3, thus shifting the input biasing level of amplifier 107. In this event, if the remote station is sending a marking signal, a negative potential is also applied to input terminal 2 of amplifier 107 by lead 29. The magnitude of the negative potential applied to input terminal 3, however, exceeds the magnitude of the negative potential applied to input terminal 2 under the conditions that only the local station is sending a space signal. Accordingly, output terminal 6 and, therefore, output lead 38 go negative, indicating that the remote station is sending a mark signal.

Finally, if both stations are sending a space signal, the negative potential on lead 29 is increased in magnitude, as previously described, to a point where it exceeds the magnitude of negative potential on input terminal 3 of amplifier 107. Thus, output terminal 6 goes positive and the positive potential on lead 38 indicates that a spacing signal is being received from the remote station.

The signals on lead 38 are applied to interference filter circuit 40, as previously described. Lead 38 extends to the base of transistor Q17 in interference filter circuit 40. The collector of transistor Q17 is, in turn, connected to a logic circuit comprising NAND gates 108, 109, 110 and 111. Each of the NAND gates normally develops a high or positive potential output if ground is applied to any one of their inputs. Conversely, the output of the NAND gate goes to ground if high potentials are applied to all of the inputs of the gate.

Referring now to FIG. 2, the collector of transistor Q17 is connected to one input of NAND gates 109 and 110. The other input to gate 109 is connected to the 0 output of monostable multivibrator 115 and one input of gate 108 is connected to the 1 output of multivibrator 115. The other inputs to gates 108 and 110 are connected to the output of gate 111. The three inputs of gate 111, in turn, are connected to the output of gate 110, to the common output of gates 108 and 109, and to lead 42 which is normally high, as described hereinafter.

Multivibrator 115 normally applies a potential essentially at ground to its output terminal 1 and a high output to its output terminal 0. The input to multivibrator 115 is provided by transistor Q18. This transistor is normally OFF, whereby positive battery is normally applied to the input of multivibrator 115 by way of resistor R20. In the event that transistor Q18 is turned ON, as described hereinafter, ground is applied by the collector of the transistor to multivibrator 115 and this negative transition operates multivibrator 115 for a predetermined interval of time. As a result thereof, output terminal 1 goes high and output terminal 0 goes to ground for the operating period of the multivibrator. This momentary interval provides the period which precludes any change in the signal passed via lead 12 to terminal 10 and is initiated by the transition of the outgoing signal. As previously described, the function is to preclude the reading of transients on the line when the outgoing signal goes from one signaling condition to the other.

Return now to transistor Q17. It is recalled that the potential on lead 38 is negative when a marking signal is being received. This turns transistor Q17 OFF, whereby a positive potential is applied to its collector by way of resistor R21. Since the 0 output terminal of multivibrator 115 is normally high, both inputs to gate 109 are, therefore, high during an incoming marking signal. The output of gate 109 is, therefore, at ground and this potential at ground is passed to gate 111, driving its output to the high condition. Thus, with an incoming marking signal the output of gate 111 is high. It is noted that during this marking condition the output of gate 108 is high due to the ground condition applied thereto by multivibrator 115 and the output of gate 110 is low since the collector of transistor Q17 and the output of gate 111 are both high.

Assume now that the output signal being transmitted by the local station switches from one condition to another. It has been assumed that the incoming signal is mark. The outgoing signal, however, may change from mark to space or from space to mark. If the outgoing signal changes from space to mark, then a positive pulse is passed to lead 16, as previously described. This pulse is then passed by way of capacitor C1 and diode D5 to the base of transistor Q18. In the event that the outgoing transition changes from mark to space, a positive pulse is passed to lead 17, as previously described. This positive pulse is then applied by way of capacitor C2 and diode D4 to the base of transistor Q18. In either event, transistor Q18 momentarily turns ON, passing ground to the input of monostable multivibrator 115. Output terminal 1 of multivibrator 115 therefore goes high and output terminal 0 goes to ground. Since output terminal 1 is connected to gate 108, as is the output of gate 111, the output of gate 108 goes to ground. Thus, ground is maintained on one input of gate 111, maintaining its output high. It is noted that this gate condition is maintained even though the signal on lead 38 may change due to transitions in the line since gate 108 is controlled by gate 111, together with multivibrator 115. Thus, the output of gate 111 is maintained in the high or marking condition regardless of the conditions on lead 38 so long as monostable multivibrator 115 is in its operated state. When, after the predetermined interval of time, monostable multivibrator 115 restores, the logic circuit is returned to its normal condition and again follows the signals on lead 38.

Assume now that an incoming space signal is being received. In this event lead 38 goes high, turning ON transistor Q17. With transistor Q17 turned ON, ground is applied to its collector, applying, in turn, ground to the inputs of gates 109 and 110. At this time the potential at output terminal 1 of multivibrator 115 is also at ground. Thus, ground is applied to a lead of gate 108, a lead of gate 109 and a lead of gate 110, whereby the outputs of all these gates are high. Since the potential on lead 42 is normally high, all of the inputs to gate 111 are high and the output of the gate, therefore, goes to ground. The ground on the output of gate 111 designates the incoming space signal.

Assume now that an outgoing signal transition occurs. In this event a positive pulse is applied to the base of transistor Q18, as previously described, whereby monostable multivibrator 115 is operated for a predetermined interval of time. The operation of monostable multivibrator 115 drives the 0 output terminal thereof to ground, thus maintaining the output of gate 109 high. Since the output of gate 111 is at ground during the incoming space condition and, further, since this output is connected to an input of gates 108 and 110, the outputs of gates 108 and 110 are also maintained high. Accordingly, all of the inputs to gate 111 are maintained in the high condition during the operated state of multivibrator 115. In the event that a line current transient is read by lead 38 and passed to transistor Q17, it is seen that this condition is blocked by logic circuit since the outputs of gates 109 and 110 are maintained high by the 0 output terminal of multivibrator 115 and the output of gate 111 respectively. Accordingly, during the operated state of multivibrator 115 the output of gate 111 maintains the spacing condition, ignoring any changes on lead 38. At the termination of the operating interval of multivibrator 115 the logic circuit is restored to its normal operation and follows the signals on lead 38.

The signal output of gate 111 is applied through inverter 112 to lead 12 and then to terminal 10 in FIG. 1. Specifically, the high marking condition at the output of gate 111 is inverted to ground by inverter 112 and this marking ground signal is passed through lead 12 to the select magnet driver circuit, generally indicated by block 116 in terminal 10. Select magnet driver circuit 116 may be any conventional circuit to drive a select magnet or equivalent device which functions to provide the appropriate record of the incoming data. Alternatively, the low or ground spacing signal output of gate 111 is inverted to a high condition by inverter 112 and this high spacing condition is also passed by way of inverter 112 to select magnet driver circuit 116, which similarly reads the high condition as an incoming spacing element.

As previously described, the signals on lead 29 are also passed to data carrier detector 32, which functions to detect whether the signal currents drop below a predetermined threshold. Lead 29 extends to input terminal 2 of difference amplifier 113 and input terminal 3 of difference amplifier 114. Input terminal 3 of amplifier 113 is connected to positive battery applied to the junction of resistors R22 and R23. Accordingly, output terminal 6 of difference amplifier 113 has a negative potential applied thereto so long as the potential on input terminal 2 exceeds the potential applied to input terminal 3 by a voltage divider comprising resistors R22 and R23. Accordingly, output terminal 6 is negative during the positive signaling conditions on lead 29 so long as these positive signaling conditions exceed a threshold determined by the potential applied to input terminal 3 of amplifier 113. Input terminal 2 of amplifier 114 has a negative potential applied thereto by a voltage divider comprising resistors R24 and R25. Accordingly, output terminal 6 of amplifier 114 is rendered negative if the signal on lead 29 is negative with respect to the potential applied to input terminal 2 or, stated in another manner, output terminal 6 of amplifier 114 is maintained negative in the event that the magnitude of the signal potential on lead 29 during negative signaling conditions exceeds the negative threshold potential applied to input terminal 2.

The outputs of terminals 6 of amplifiers 113 and 114 are passed through an OR gate comprising diodes D6 and D7 to the base of transistor Q16. During normal signaling conditions the magnitude of the signal on lead 29 exceeds one of the previously described thresholds, whereby either amplifier 113 or amplifier 114 generates a negative signal output and this negative signaling output is therefore passed through the OR gate to the base of transistor Q16, maintaining the transistor turned OFF. This provides a positive potential at the collector of transistor Q16 by way of resistor R26. This positive potential is passed to timer 117, which normally provides a potential substantially at ground at its output. This potential is then passed by way of pulse stretcher 118 to inverters 119 and 120. Inverter 120 responds to the potential substantially at ground by providing a positive potential to output lead 42, which output potential is passed to gate 111, as previously described.

Inverter 119 provides a high output condition in response to the output ground of pulse stretcher 118. This high output condition is reinverted to ground by inverter 121. This ground is then applied to lead 18 and lead 18 extends to the base of transistor Q3 in transmitter 15 to normally maintain the transistor conducting, as previously described. The output ground of inverter 121 is also passed to the base of transistor Q22, turning this transistor ON. This renders the collector of transistor Q22 positive and the positive potential is passed to lead 45, which extends to alarm circuit 46. The positive potential on lead 45 is the normal operating condition and alarm circuit 46 is maintained quiescent under this condition.

Assume now that the magnitude of the signal on lead 29 drops below either of the two previously described thresholds. This can occur for a prolonged interval of time and thus constitute an alarm condition or can occur as a result of line hits or signal transitions, which latter conditions are considered normal operating conditions. In any event, during the interval that the magnitude of the signal does not exceed either one or the other of the threshold conditions, both output terminals 6 of amplifiers 113 and 114 are high. This permits the application of a positive potential to the base of transistor Q16 by way of resistor R27. Transistor Q16 thereupon turns ON, applying ground to the collector and, therefore, to the input, of timer 117.

Timer 117 is a conventional timing circuit which times the input ground signal interval. When the signal restores to the high condition, timer 117 concurrently restores. In the event, however, that the ground signal condition prevails for a predetermined interval of time, timer 117 times out and the normal output ground condition of timer 117 goes high. This high output condition then prevails until the input condition restores to the normal high potential, whereupon the output of timer 117 concurrently restores to the normal potential at ground. It is noted that the time out interval of timer 117 is made sufficiently long to preclude its operation in response to short hits on the line and to normal signal transitions. Conversely, if the input ground condition on timer 117 prevails for an interval longer than the time out interval, then it is considered that a true loss of signaling current has occurred on signal transmission line 4.

As previously described, the output of timer 117 is passed to pulse stretcher 118. Pulse stretcher 118 delays the terminal portion of any positive condition applied thereto by maintaining its high output for a predetermined interval after the output of timer 117 restores to ground. Accordingly, in the event that a loss of signal occurs on transmission line 4, the positive condition applied by timer 117 to pulse stretcher 118 is stretched to provide an increased width. This increased width is utilized for relatively short interval signal failures to provide an appropriate interval to enable subsequent circuits to designate the alarm condition. In addition, pulse stretcher 118 also functions to prevent momentary noise currents which may appear on transmission line 4 during the alarm condition from deactivating alarm circuit 46.

With the output of pulse stretcher 118 in the positive alarm condition, inverter 120 provides ground to lead 42. This output ground is passed to gate 111, which, therefore, generates at its output a positive marking signal. Accordingly, during the alarm condition inverter 112 passes a marking ground to terminal 10 by way of lead 12 and this marking ground is held so long as the alarm condition prevails.

The positive alarm signal is also passed by pulse stretcher 118 to inverters 119 and 121. Inverter 121, therefore, generates a high output condition which is passed to transistor Q22 and to lead 18. The high condition on lead 18 turns OFF transistor Q3 in transmitter 15, precluding the turning ON of transistor Q2. Since transistor Q2 is maintained OFF during the alarm condition, transmitter 15 is providing an output marking signal condition. This output signaling condition is also maintained for the alarm signal interval.

The positive signal applied to transistor Q22 turns the transistor OFF. Negative potential is, therefore, applied through resistor R28 and diode D8 to lead 45. The negative potential thereby applied to alarm circuit 46 constitutes the alarm condition. Alarm circuit 46 thereupon raises its appropriate visual and/or audible alarm and this alarm condition may be maintained for the alarm period or until reset by an operator in the conventional manner.

Although a specific embodiment of this invention has been shown and described, it will be understood that various modifications may be made without departing from the spirit of this invention.

We claim:

1. In a full duplex data set including means for applying direct-current signals to a communication line, means for detecting the magnitude of the cumulative signaling current in said line, and further means jointly operated by the magnitude of the cumulative signaling current in the line and the means for applying the direct-current signals to the line for recognizing incoming direct-current signals characterized in that said further means includes a signal slicer having an input connected to the detecting means and other means responsive to the applying means and controlled in accordance with the signals applied to the line by said applying means for varying the slicing level of the signal slicer.

2. In a full duplex data set in accordance with claim 1 wherein said other means produces a bias voltage for said signal slicer, the magnitude of said bias voltage being controlled by the signals applied to the line.

3. In a full duplex data set in accordance with claim 2 wherein said detecting means produces a signal voltage having a magnitude designating the magnitude of the cumulative signaling current in the line.

4. In a full duplex data set in accordance with claim 3 wherein said signal slicer comprises a difference amplifier for comparing the signal voltage with the bias voltage.

5. A full duplex polar signaling data system having at least one local and one remote station, each station having means for impressing current on the signaling line so that the direction of the current impressed by each station corresponds to the data signal being transmitted and the magnitude and direction of the cumulative line current is determined by the currents impressed by both stations, and means for recovering incoming signals, said recovering means comprising:

detecting means for producing a signal voltage having a magnitude controlled by the direction and magnitude of the line current;

means for producing a bias voltage having a magnitude controlled by the direction of the current impressed on the line by the local station; and a signal slicer for opposing the signal voltage with the bias voltage to recover the incoming signals from the remote station.

6. A full duplex polar signaling data system in accordance with claim 5 wherein said signal slicer comprises a difference amplifier.

7. A full duplex polar signaling data system in accordance with claim 5 wherein said signal slicer further includes means at the output thereof for filtering out line transients caused by reversals in the direction of the current impressed on the line by the station thereat.

8. A full duplex polar signaling data system in accordance with claim 7 wherein said further means includes means responsive to any one of the reversals for momentarily precluding any output change of the signal slicer.